US011558660B2

(12) United States Patent
Wright et al.

(10) Patent No.: US 11,558,660 B2
(45) Date of Patent: Jan. 17, 2023

(54) METHODS AND APPARATUS TO REDUCE FALSE CREDITING OF EXPOSURE TO VIDEO-ON-DEMAND MEDIA ASSETS

(71) Applicant: The Nielsen Company (US), LLC, New York, NY (US)

(72) Inventors: David H. Wright, Safety Harbor, FL (US); Daniel Nelson, Tampa, FL (US); Raghuram Ranganathan, Tampa, FL (US); Derrick McCulley, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 16/888,065

(22) Filed: May 29, 2020

(65) Prior Publication Data

US 2021/0377602 A1 Dec. 2, 2021

(51) Int. Cl.
*H04N 21/442* (2011.01)
*H04N 21/235* (2011.01)

(52) U.S. Cl.
CPC ... *H04N 21/44204* (2013.01); *H04N 21/2353* (2013.01)

(58) Field of Classification Search
CPC .............. H04N 21/44204; H04N 21/2353
USPC .......................................... 725/19
See application file for complete search history.

(56) References Cited

U.S. PATENT DOCUMENTS 9,900,636 B2  2/2018  Srinivasan
10,321,171 B2  6/2019  Srinivasan
2005/0177716 A1*  8/2005  Ginter ............... G06F 21/10
                                                      713/157
2010/0131970 A1  5/2010  Falcon
2010/0257052 A1  10/2010  Zito et al.
2012/0117584 A1*  5/2012  Gordon ............ H04N 21/23418
                                                      725/19

(Continued)

OTHER PUBLICATIONS

International Searching Authority, "Search Report and Written Opinion," issued in connection with Application No. PCT/US2021/034311, dated Sep. 7, 2021, 9 pages.

(Continued)

*Primary Examiner* — Alfonso Castro
(74) *Attorney, Agent, or Firm* — Hanley, Flight & Zimmerman, LLC

(57) ABSTRACT

Methods, apparatus, systems and articles of manufacture are disclosed to reduce false crediting of exposure to video-on-demand media assets. Example apparatus disclosed herein include a signature matcher to compare a sequence of monitored media signatures to sequences of reference signatures representative of corresponding reference media assets, the sequence of monitored media signatures included in monitoring data reported by a media device meter, the sequences of reference signature stored in a library of reference signatures. Disclosed example apparatus also include a matched assets counter to determine a count of ones of the reference media assets represented by corresponding ones of the sequences of reference signatures determined to match the sequence of monitored media signatures. Disclosed examples further include a credit determiner to determine whether to credit media exposure to a first one of the reference media assets based on the count.

13 Claims, 6 Drawing Sheets

(56) References Cited

U.S. PATENT DOCUMENTS

| | | | |
|---|---|---|---|
| 2013/0251189 A1* | 9/2013 | McMillan | H04N 21/44204 |
| | | | 382/100 |
| 2014/0282671 A1* | 9/2014 | McMillan | H04N 21/44213 |
| | | | 725/19 |
| 2014/0330854 A1 | 11/2014 | Samari et al. | |
| 2015/0289013 A1 | 10/2015 | Nelson et al. | |
| 2016/0065635 A1* | 3/2016 | Besehanic | G06Q 30/02 |
| | | | 709/224 |
| 2016/0094877 A1 | 3/2016 | Heffernan et al. | |
| 2017/0188067 A1* | 6/2017 | Sullivan | H04N 21/4667 |
| 2018/0191850 A1* | 7/2018 | Tapse | H04L 67/22 |
| 2018/0316986 A1 | 11/2018 | Nagorski et al. | |
| 2019/0037257 A1 | 1/2019 | Nelson et al. | |
| 2020/0153521 A1 | 5/2020 | Nelson et al. | |

OTHER PUBLICATIONS

The International Bureau of WIPO, "International Preliminary Reporton Patentability," mailed in connection with Application No. PCT/US2021/034311 dated Nov. 8, 2022, 6 pages.

\* cited by examiner

METHODS AND APPARATUS TO REDUCE FALSE CREDITING OF EXPOSURE TO VIDEO-ON-DEMAND MEDIA ASSETS

FIELD OF THE DISCLOSURE

This disclosure relates generally to media identification systems, and, more particularly, to methods and apparatus to reduce false crediting of exposure to video-on-demand media assets.

BACKGROUND

A media monitoring entity can generate audio signatures from a media signal. Audio signatures are a condensed reference that can be used to subsequently identify the media. These signatures can be hashed to allow faster matching in an audio signature database. In some examples, a media monitoring entity can monitor a media source feed (e.g., a television feed, etc.) to generate reference signatures representative of media presented via that media source feed. Such reference signatures can be compared to signatures generated by media monitors to credit viewership of the media.

BRIEF DESCRIPTION OF THE DRAWINGS

The figures are not to scale. In general, the same reference numbers will be used throughout the drawing(s) and accompanying written description to refer to the same or like parts.

Figure 1:
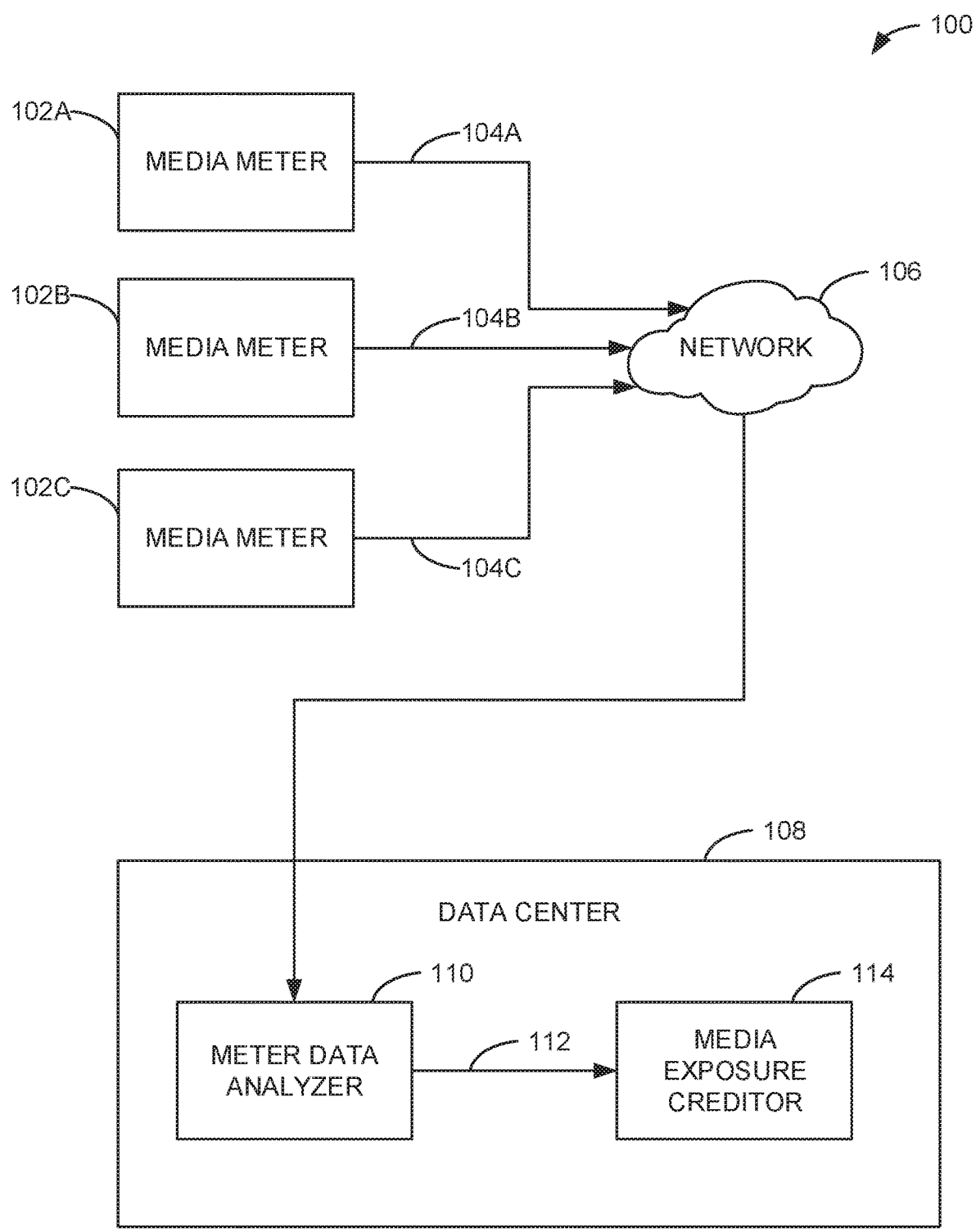
FIG. 1 is a block diagram of an example environment in which the teachings of this disclosure may be implemented.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc. As used herein, the term "media asset" refers to any individual, collection, or portion/piece of media of interest. For example, a media asset may be a television show episode, a movie, a clip, etc. Media assets can be identified via unique media identifiers (e.g., a name of the media asset, a metadata tag, etc.). Media assets can be presented by any type of media presentation method (e.g., via streaming, via live broadcast, from a physical medium, etc.).

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.), etc.

In some examples, audio watermarking is used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the watermark is embedded in the audio or video component so that the watermark is hidden.

As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

To identify watermarked media, the watermark(s) are extracted and used to access a table of reference watermarks that are mapped to media identifying information. In some examples, media monitoring companies provide watermarks and watermarking devices to media providers with which to encode their media source feeds. In some examples, if a media provider provides multiple media source feeds (e.g., ESPN and ESPN 2, etc.), a media provider can provide a different watermark for each media source feed. In some examples, a media provider could encode a media source feed with an incorrect watermark (e.g., a watermark meant for ESPN could accidentally be encoded on ESPN2, etc.). In this example, crediting using only watermarking could result in the wrong media source feed being credited.

Examples disclosed herein utilize signature matching to identify media. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signature is found, the monitored media can be identified as corresponding to the particular reference media represented by the reference signature that matched with the monitored signature. In some examples, signature matching is based on sequences of signatures such that, when a match between a sequence of monitored signatures and a sequence of reference signatures is found, the monitored media can be identified as corresponding to the particular reference media represented by the sequence of reference signatures that matched the sequence of monitored signatures. Because attributes, such as an identifier of the media, a presentation time, a broadcast channel, etc., are collected for the reference signature(s), these attributes may then be associated with the monitored media whose monitored signature matched the reference signature(s). Example systems for identifying media based on codes and/or signatures are long known and were first disclosed in Thomas, U.S. Pat. No. 5,481,294, which is hereby incorporated by reference in its entirety.

Media monitoring entities, such as The Nielsen Company (US), LLC, desire knowledge regarding how users interact with media devices such as smartphones, tablets, laptops, smart televisions, etc. In particular, media monitoring entities want to monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitoring data based on the media exposure of those users. Such media meters can be associated with a specific media device (e.g., a television, a mobile phone, a computer, etc.) and/or a specific person (e.g., a portable meter, etc.).

Media monitoring entities can generate media reference databases that can include unhashed signatures, hashed signatures, and watermarks. These references are generated by a media monitoring entity (e.g., at a media monitoring station (MMS), etc.) by monitoring a media source feed, identifying any encoded watermarks and determining signatures associated with the media source feed. In some examples, the media monitoring entity can hash the determined signatures. A media monitoring entity may additionally and/or alternatively generate reference signatures for downloaded reference media, reference media transmitted to the media monitoring entity from one or more media providers, etc.

The reference database can be compared (e.g., matched, etc.) to media monitoring data (e.g., watermarks, unhashed signatures, hashed signatures, etc.) gathered by media meter(s) to allow crediting of media exposure. Monitored media can be credited using one, or a combination, of watermarks, unhashed signatures and hashed signatures. However, media exposure crediting based on signature matching at can result in incorrect, or false, crediting of a media exposure to a media asset that was not presented by a media device to which the panelist was exposed. For example, a movie or television show can have a period of time during which its audio corresponds to a song (e.g., a song playing during the credits scene at the end of a movie or television show). In some such examples, the media asset for the movie or television show includes reference media signatures representative of the song. However, the panelist may also be able to listen to that same song via a music streaming application on the same media device (e.g., on a Pandora station, etc.). Some matching techniques may incorrectly match the media signatures from the song on the Pandora station with the reference signatures of the movie or television show that included that song in the credits scene, especially if the matching duration is relatively short. In comparison, examples disclosed herein determine a total count of different media assets that matched with the media signature. In some examples disclosed herein, the media exposure is not credited to the media asset of a reference signature if the total amount of matches for the media signature does not satisfy a threshold, which reduces the likelihood that the media exposure is credited to the wrong media asset, especially when the matching occurs in relatively short durations.

In some examples, media monitoring entities store generated reference databases and gathered monitoring data on cloud storage services (e.g., Amazon Web Services™, etc.). To allow the crediting of time-shifted viewing (e.g., viewing media via a digital video recorder (DVR), etc.), the stored references are retained for a period time after the initial presentation of the media.

Methods and apparatus disclosed herein enable the optimization of reference signature matching. Example methods disclosed herein include comparing a sequence of monitored media signatures to sequences of reference signatures representative of corresponding reference media assets, the sequence of monitored media signatures included in monitoring data reported by a media device meter, the sequences of reference signature stored in a library of reference signatures. Disclosed examples also include determining a count of ones of the reference media assets represented by corresponding ones of the sequences of reference signatures determined to match the sequence of monitored media signatures. Disclosed examples further include, determining whether to credit media exposure to a first one of the reference media assets based on the count.

FIG. 1 is a block diagram of an example environment 100 in which the teachings of this disclosure may be implemented. The example environment 100 includes an example first media meter 102A, an example second media meter 102B and an example third media meter 102C, which output example first monitoring data 104A, example second monitoring data 104B, and example third monitoring data 104C, respectively, to an example network 106. The environment 100 further includes an example data center 108, which includes an example meter data analyzer 110. In the illustrated example, the meter data analyzer 110 outputs identification data 112 to an example media exposure creditor 114.

The example media meters 102A, 102B, 102C collect media monitoring information. In some examples, the media meters 102A, 102B, 102C are associated with (e.g., installed on, coupled to, etc.) respective media devices. For example, a media device associated with one of the media meters 102A, 102B, 102C presents media (e.g., via a display, etc.). In some examples, the media device associated with one of the media meters 102A, 102B, 102C additionally or alternatively presents the media on separate media presentation equipment (e.g., speakers, a display, etc.). For example, the media device(s) associated with the media meters 102A, 102B, 102C can include a personal computer, an Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), televisions, desktop computers, laptop computers, servers, etc. In such examples, the media meters 102A, 102B, 102C can have direct connections (e.g., physical connections) to the devices to be monitored, and/or may be connected wirelessly (e.g., via Wi-Fi, via Bluetooth, etc.) to the devices to be monitored.

Additionally or alternatively, in some examples, one or more of the media meters 102A, 102B, 102C are portable meters carried by one or more individual people. In the illustrated example, the media meters 102A, 102B, 102C monitor media presented to one or more people associated with the media meters 102A, 102B, and 102C and generate the example monitoring data 104A, 104B, 104C. In some examples, monitoring data 104A, 104B, 104C generated by the media meters 102A, 102B, 102C can determine signatures associated with the presented media. For example, the media meters 102A, 102B, 102C can determine a signature (e.g., generate signatures, extract signatures, etc.) associated with the presented media. Such signatures may be referred to as monitored media signatures or monitored signatures as they are determined from media monitored by the media meters 102A, 102B, 102C. Example signature generation techniques that may be implemented by the media meters 102A, 102B, 102C include, but are not limited to, examples disclosed in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Pat. No. 9,438,940 issued to Nelson on Sep. 6, 2016; U.S. Pat. No. 9,548,830 issued to Kariyappa et al. on Jan. 17, 2017; U.S. Pat. No. 9,668,020 issued to Nelson et al. on May 30, 2017; U.S. Pat. No. 10,200,546 issued to Nelson et al. on Feb. 5, 2019; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008.

Accordingly, the monitoring data 104A, 104B, 104C can include monitored media signatures and/or monitored media watermarks representative of the media monitored by the media meters 102A, 102B, 102C. In some examples, the monitoring data 104A, 104B, 104C is associated with a discrete, measurement time period (e.g., five minutes, ten minutes, etc.). In such examples, the monitoring data 104A, 104B, 104C can include a sequences of monitored media signatures associated with media asset(s) (or portions thereof) presented by the media devices monitored by the media meters 102A, 102B, 102C.

The example network 106 is a network used to transmit the monitoring data 104A, 104B, 104C to the data center 108. In some examples, the network 106 can be the Internet or any other suitable external network. In other examples, the network 106 can be a cable broadcast system and the monitoring data 104A, 104B, 104C could be return path data (RPD). In other examples, any other suitable means of transmitting the monitoring data 104A, 104B, 104C to the data center 108 can be used.

The example data center 108 is an execution environment used to implement the example meter data analyzer 110 and the example media exposure creditor 114. In some examples, the data center 108 is associated with a media monitoring entity. In some examples, the data center 108 can be a physical processing center (e.g., a central facility of the media monitoring entity, etc.). Additionally or alternatively, the data center 108 can be implemented via a cloud service (e.g., AWS™, etc.). In this example, the data center 108 can further store and process generated watermark and signature reference data.

The example meter data analyzer 110 processes the gathered media monitoring data to detect, identify, credit, etc. respective media assets and/or portions thereof (e.g., media segments) associated with the corresponding monitoring data 104A, 104B, 104C. For example, the meter data analyzer 110 can compare the monitoring data 104A, 104B, 104C to generated reference data to determine what respective media assets and/or media segments are associated with the corresponding monitoring data 104A, 104B, 104C. In some examples, the meter data analyzer 110 can hash the signatures included in the monitoring data 104A, 104B, 104C. In some examples, the meter data analyzer 110 can identify the media by matching unhashed signatures and/or hashed signatures. The meter data analyzer 110 of the illustrated example also analyzes the monitoring data 104A, 104B, 104C to determine if a media asset, and/or particular portion(s) (e.g., segment(s)) thereof, is to be credited as a media exposure represented in the monitoring data 104A, 104B, 104C. For example, the meter data analyzer 110 can compare monitored signatures included in the first monitoring data 104A to a library of generated reference signatures representative of reference media assets to determine the duration(s) of the matches between the monitored media signatures and the reference signatures. In some examples, the meter data analyzer 110 determines the total number of media assets associated with the matches between a sequence of monitored signatures and the library of reference signatures. In some examples, if the total number of matches does not satisfy a threshold, then the media represented by the signatures associated with the first monitoring data 104A is not credited to any media assets. In some examples, if the total number of matches satisfies the threshold, then the media represented by the signatures from the first monitoring data 104A is credited to the media asset(s) of the matched reference signature(s). An example implementation of the meter data analyzer 110 is described below in conjunction with FIG. 2.

The example identification data 112 includes information to credit user(s) associated with the media meters 102A, 102B, 102C with exposure to particular media assets. For example, the identification data 112 can include associations between monitoring data 104A, 104B, 104C and particular media assets. The example media exposure creditor 114 uses the identification data 112 to credit media with having been exposed to user(s). In some examples, the media exposure creditor 114 generates a report including data metrics that may be presented to media providers.

Figure 2:
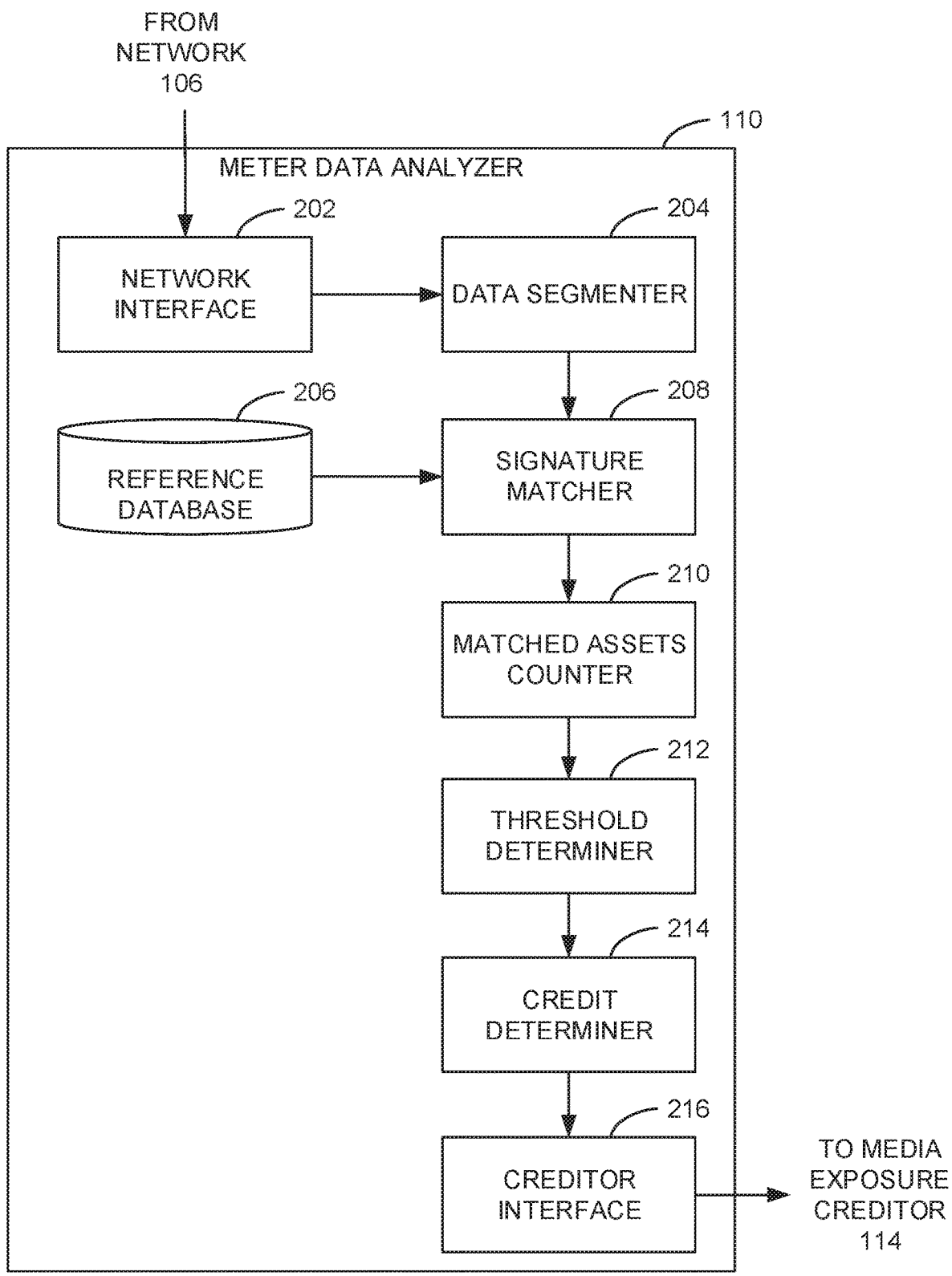
FIG. 2 is a block diagram of an example implementation of a meter data analyzer included in the example environment of FIG. 1.

FIG. 2 is a block diagram of an implementation of the meter data analyzer 110 of FIG. 1. In the illustrated example, the meter data analyzer 110 includes an example network interface 202, an example data segmenter 204, an example reference database 206, an example signature matcher 208, an example matched assets counter 210, an example threshold determiner 212, an example credit determiner 214, and an example creditor interface 216.

The example network interface 202 of the illustrated example of FIG. 2 allows the example meter data analyzer 110 of FIG. 1 to receive the monitoring data 104A, 104B, 104C from the example network 106. In some examples, the network interface 202 can convert the monitoring data 104A, 104B, 104C into a format readable by the meter data analyzer 110. In some examples, the network interface 202 can be in continuous communication with the network 106, the first media meter 102A, the second media meter 102B and/or the third media meter 102C. In other examples, the network interface 202 can be in intermittent (e.g., periodic or aperiodic) communication with the network 106, the first media meter 102A, the second media meter 102B and/or the third media meter 102C. In some examples, the network interface 202 can be absent. In such examples, the media meters 102A, 102B, 102C can be in direct communication with the meter data analyzer 110. For example, if the example meter data analyzer 110 is implemented via a cloud service, some or all of the media meters 102A, 102B, 102C can upload the monitoring data 104A, 104B, 104C directly to the cloud service.

The example data segmenter 204 identifies a sequence of monitored media signatures associated with the monitoring data 104A, 104B, 104C. In some examples, the data segmenter 204 identifies a time duration of the sequence of monitored media signatures based on the amount of time between the first monitored media signature in the sequence and the last monitored media signature in the sequence. The example data segmenter 204 segments the received example monitoring data 104A, 104B, 104C associated with the sequence of monitored media signatures into discrete time segments. In some examples, the discrete time segments are periods of time (e.g., three minutes, five minutes, etc.), which are referred to herein as evaluation periods. For example, the data segmenter 204 can divide the monitoring data 104A, 104B, 104C associated with the sequence of monitored media signatures into temporally adjacent evaluation periods. In some examples, the monitoring data 104A, 104B, 104C associated with the sequence of monitored media signatures is segmented into temporally adjacent evaluation periods to determine signature matches associated with the sequence of monitored media signatures and reference signatures from the reference database 206 in each evaluation period.

The example reference database 206 of the illustrated example of FIG. 2 includes generated reference signatures created or otherwise obtained by the example data center 108 of FIG. 1. In some examples, the media monitoring entity associated with the reference database 206 can directly monitor media source feeds to generate reference signatures. Additionally or alternatively, the media monitoring entity associated with the reference database 206 can generate reference signatures from downloaded reference media, etc. In examples disclosed herein, the reference signatures are generated in the same or similar manner as the monitored media signatures such that the reference signatures and the monitored media signatures for the same media asset would match. In some examples, each reference signature stored in the reference database 206 is associated with a particular reference media asset, such as, but not limited to, an episode of a television series, a movie, an advertisement, etc. In some examples, each reference signature stored in the reference database 206 is associated with a timestamp, which indicates a position in the reference media asset represented by each reference signature. In some examples, the reference database 206 can include a library (e.g., database, table, etc.) of reference signatures.

The example signature matcher 208 of the illustrated example of FIG. 2 compares the monitored media signatures in the example monitoring data 104A, 104B, 104C to the reference signatures in the example reference database 206 in each evaluation period to identify media associated with monitoring data 104A, 104B, 104C. For example, the signature matcher 208 can determine if the monitored media signatures of the monitoring data 104A, 104B, 104C in each evaluation period match any reference signatures stored in the reference database 206. In some examples, some or all of the monitored media signatures of the monitoring data 104A, 104B, 104C in each evaluation period can match with corresponding reference signatures in the reference database 206 that represent a piece of reference media (e.g., reference signatures associated with a television episode, etc.). In some examples disclosed herein, the signature matcher 208 may perform matching using any suitable means (e.g., linear matching, hashed matching, etc.). The example signature matcher 208 determines the strength of the signature matching throughout the monitoring data 104A, 104B, 104C in each evaluation period. As used herein, a "strong match" and a "weak match" are based on the number of signature matches that occur within the evaluation period. For example, a strong match can correspond to relatively high number of signature matches in a period of time (e.g., one signature match per second, five signature matches per second, etc.) and a weak match can correspond to relatively low number of signature matches in a period of time (e.g., one signature match per five seconds, etc.). However, any other suitable number of signature matches in the evaluation period can correspond to strong matching. The example signature matcher 208 determines strong matches using a strong match threshold. In some examples, the strong match threshold can be three signature matches per second, etc. The example signature matcher 208 determines strong matches when the number of signature matches between the sequence of monitored media signatures and the reference signatures meets or exceeds the strong match threshold.

The example matched assets counter 210 generates a count of a number of unique media assets that are associated with the strong matches that were identified by the example signature matcher 208. The example matched assets counter 210 identifies all of the strong matches between the monitored media signatures from the monitoring data 104A,

104B, 104C for each evaluation period and the reference signatures from the example reference database 206. The example matched assets counter 210 identifies the unique media assets that are associated with the reference signatures identified by the strong matches for each evaluation period. The example matched assets counter 210 determines the total number of unique media assets that are associated with the sequences of reference signatures identified by the strong matches for each evaluation period.

The example threshold determiner 212 of the illustrated example of FIG. 2 determines if the number of unique media assets identified by the example matched assets counter 210 satisfies a media asset threshold. For example, the media asset threshold may be two unique media assets found by the example matched assets counter 210. However, other media asset thresholds may additionally and/or alternatively be used such as, for example, five unique media assets, ten unique media assets, etc. In the illustrated example, if the example threshold determiner 212 determines that the number of unique media asset(s) identified by the strong matches from the example matched assets counter 210 is below the media asset threshold, the example threshold determiner 212 identifies the unique media asset(s) associated with the reference signatures corresponding to the strong matches to the example credit determiner 214, thereby causing the matched media asset(s) to be credited. However, if the number of unique media asset(s) identified by the strong matches from the example matched assets counter 210 equals or exceeds the media asset threshold, the example threshold determiner 212 does not identify the unique media asset(s) associated with the reference signatures corresponding to the strong matches to the example credit determiner 214, thereby causing the matched media asset(s) not to be credited.

The example credit determiner 214 of the illustrated example of FIG. 2 is provided to determine if the media exposure should be credited to the media asset(s) associated with the sequence(s) of reference signatures identified by the strong matches from the example matched assets counter 210. The example credit determiner 214 uses the output of the example threshold determiner 212 to determine if the media asset(s) should be credited with the media exposure. In some examples, if the threshold determiner 212 determines that the number of unique media assets does not satisfy (e.g., is equal to or greater than) the media asset threshold, the example threshold determiner 212 does not provide media asset(s) to the example credit determiner 214. In such examples, the credit determiner 214 does not credit the media exposure to any media assets. In some examples, if the threshold determiner 212 determines that the number of unique media assets found by the example matched assets counter 210 does satisfy (e.g., is less than) the media asset threshold, the example threshold determiner 212 provides the identified unique media asset(s) to the example credit determiner 214. In such examples, the example credit determiner 214 credits the media exposure to the unique media asset(s).

The example creditor interface 216 of the illustrated example of FIG. 2 generates the example identification data 112 of FIG. 1 based on the output of the example credit determiner 214. In some examples, the creditor interface 216 identifies what media event(s) are associated with each data segment of the media exposure creditor 114. In some examples, the creditor interface 216 transmits the identification data 112 to the media exposure creditor 114.

Figure 3A:
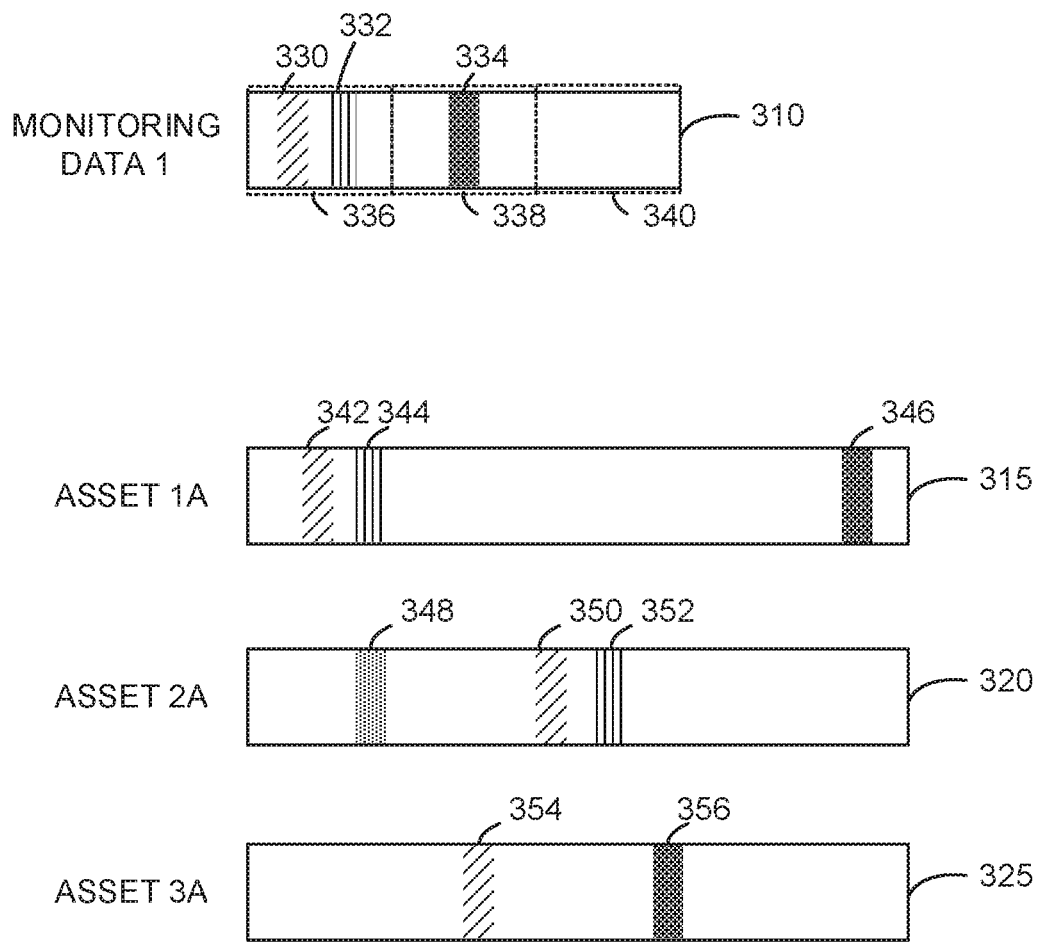
FIGS. 3A and 3B are example diagrams representative of example operations of the meter data analyzer of FIG. 2 to perform signature matching between reference media assets and monitored media sessions in accordance with the teachings of this disclosure.

FIG. 3A is an example diagram representative of example reference media assets and example monitoring data that are processed by the example meter data analyzer 110 of FIG. 2 to determine signature matches for the purpose of crediting media exposure to the reference media assets. The example diagram of FIG. 3A includes example monitoring data 310, an example reference media asset 315, an example reference media asset 320, and an example reference media asset 325. The example media assets 315, 320, 325 are representative of example media assets stored in the example reference database 206. The example monitoring data 310 is representative of example monitoring data 104A, 104B, 104C collected by one of the example media meters 102A, 102B, 102C, which is assumed for the sake of convenience to be the example monitoring data 104A collected by the example media meter 102A in the illustrated example.

The example monitoring data 310 of the illustrated example of FIG. 3A includes example monitored media signatures 330, 332, 334 generated by the example media meter 102A. The example reference media asset 315 is associated with example reference signatures 342, 344, 346 generated to be representative of the reference media asset 315. The example reference media asset 320 is associated with example reference signatures 348, 350, 352 generated to be representative of the reference media asset 320. The example reference media asset 325 is associated with example reference signatures 354, 356 generated to be representative of the reference media asset 325.

In the illustrated example, the example monitored media signatures 330, 332, and 334 that are associated with the example monitoring data 310 are representative of the monitored media signatures included in the example monitoring data 104A. In the illustrated example, the reference signatures 342, 344, 346, 348, 350, 352, 354, 356 associated with the example media assets 315, 320, 325 correspond to example reference signatures determined and stored in the example reference database 206.

The illustrated example of FIG. 3A represents monitoring data that is not credited to a reference media asset based on the signature matching performed by the example meter data analyzer 110 of FIG. 2. The example media meter 102A generates the example monitored media signatures 330, 332, and 334 from the example monitoring data 310. The example network interface 202 obtains the sequence of monitored media signatures 330, 332, and 334 from the example monitoring data 310.

In the illustrated example of FIG. 3A, the example data segmenter 204 segments the example monitoring data 310 into evaluation periods 336, 338, 340. In some examples, the data segmenter 204 identifies a time duration of the sequence of monitored media signatures 330, 332, 334. As described above, the evaluation periods are discrete periods of time (e.g., three minutes, five minutes, etc.). In this illustrated example, the data segmenter 204 divides the monitoring data 310 associated with the sequence of monitored media signatures 330, 332, 334 into temporally adjacent evaluation periods 336, 338, 340.

In the illustrated example of FIG. 3A, the example signature matcher 208 obtains the monitored media signatures from the example monitoring data 310 for each evaluation period. For example, the example signature matcher 208 obtains the monitored media signatures 330, 332 for evaluation period 336 and the monitored media signature 334 for evaluation period 338. The example signature matcher 208 determines if the example monitored media signatures 330, 332, 334 from the example monitoring data 310 for each evaluation period 336, 338, 340 match the references signatures 342, 344, 346, 348, 350, 352, 354, 356 from the example reference database 206. In some examples, the signature matcher 208 may perform matching using any suitable means (e.g., linear matching, hashed matching, etc.). In the illustrated example, the signature matcher 208 determines that the monitored media signature 330 matches the reference signatures 342, 350, 354 during the evaluation period 336. The example signature matcher 208 determines that the monitored media signature 332 matches the reference signatures 344, 352 during the evaluation period 336. The example signature matcher 208 determines that the monitored media signature 334 matches the reference signatures 346, 356 during the evaluation period 338.

In the illustrated example of FIG. 3A, the example signature matcher 208 then determines strong matches between the monitored media signatures 330, 332, 334 of the example monitoring data 310 and the reference signatures 342, 344, 346, 348, 350, 352, 354, 356 of the media assets 315, 320, 325. The example signature matcher 208 determines the strength of the signature matching throughout the monitoring data 104A in each evaluation period 336, 338, 340. As described above, a "strong match" and a "weak match" are based on the number of signature matches that occur within the evaluation period. For example, a strong match can correspond to relatively high number of signature matches in a period of time (e.g., one signature match per second, five signature matches per second, etc.) and a weak match can correspond to relatively low number of signature matches in a period of time (e.g., one signature match per five seconds, etc.).

The example signature matcher 208 determines strong matches using a strong match threshold. In some examples, the strong match threshold can be three signature matches per second, etc. The example signature matcher 208 determines strong matches when the number of signature matches between the sequence of monitored media signatures and the reference signatures meets or exceeds the strong match threshold. In the illustrated example, the strong match threshold is assumed for the sake of convenience to be one signature matches per minute. In the illustrated example, the signature matcher 208 determines that the example media session 310 has strong matches between the example monitored media signatures 330, 332 and the example reference signatures 342, 344 associated with media asset 315, the example reference signatures 350, 352 associated with media asset 320, and example reference signature 354 associated with media asset 325 during the evaluation period 336. In the illustrated example, the signature matcher 208 determines that the example monitoring data 310 has strong matches between the example monitored media signature 334 and the example reference signature 346 associated with media asset 315 and the example reference signature 356 associated with media asset 325 during the evaluation period 338.

In the illustrated example of FIG. 3A, the matched assets counter 210 then determines the number of unique media assets associated with the reference signatures from the reference database 206 identified by the strong matches for each evaluation period 336, 338, 340. The example matched assets counter 210 identifies all of the strong matches between the sequence of monitored media signatures from the monitoring data 104A during each evaluation period 336, 338, 340 and the sequences of reference signatures from the example reference database 206. The example matched assets counter 210 identifies the unique media assets that are associated with the reference signatures identified by the strong matches for each evaluation period 336, 338, 340. The example matched assets counter 210 determines the total number of unique media assets that are identified by the strong matches for each evaluation period 336, 338, 340. In the illustrated example, the matched assets counter 210 determines that the strong matches identify the unique media assets 315, 320, and 325 associated with the matched reference signatures 342, 344, 350, 352, and 354 for the evaluation period 336. In the illustrated example, the matched assets counter 210 determines the monitoring data 310 has a total of three unique media assets associated with the strong matches for the evaluation period 336. In the illustrated example, the matched assets counter 210 determines that the strong matches identify the unique media assets 315 and 325 associated with the matched reference signatures 346 and 356 for the evaluation period 338. In the illustrated example, the matched assets counter 210 determines the monitoring data 310 has a total of two unique media assets associated with the strong matches for the evaluation period 338.

The example threshold determiner 212 determines if the total number of media assets associated with the strong matches for the example monitoring data 310 satisfies the example media asset threshold. In the illustrated example, the media asset threshold value is assumed to be two unique media assets found by the example matched assets counter 210. However, other media asset thresholds may additionally and/or alternatively be used such as, for example, five unique media assets, ten unique media assets, etc. In the illustrated example, the threshold determiner 212 determines the example monitoring data 310 for evaluation period 336 and the example monitoring data 310 for evaluation period 336 do satisfy the example media asset threshold since the monitoring data 310 for evaluation period 338 has three unique media assets associated with the strong matches and the monitoring data 310 for evaluation period 338 has two unique media assets associated with the strong matches.

The example credit determiner 214 then determines if an example media asset 315, 320, 325 should be credited for the media exposure of the example monitoring data 310 for each of the evaluation period 336, 338, 340. The example credit determiner 214 uses the output from the example matched assets counter 210 and the example threshold determiner 212. In some examples, the credit determiner 214 determines that the monitoring data 310 for evaluation period 336 will not be credited to any of the media assets 315, 320, 325 since the monitoring data 310 for the evaluation period 336 satisfies the media asset threshold. In some examples, the credit determiner 214 determines that the monitoring data 310 for evaluation period 338 will not be credited to any of the media assets 315, 320, 325 since the monitoring data 310 for the evaluation period 336 satisfies the media asset threshold. In the illustrated example, the credit determiner 214 does not output crediting information to the creditor interface 216.

Figure 3B:
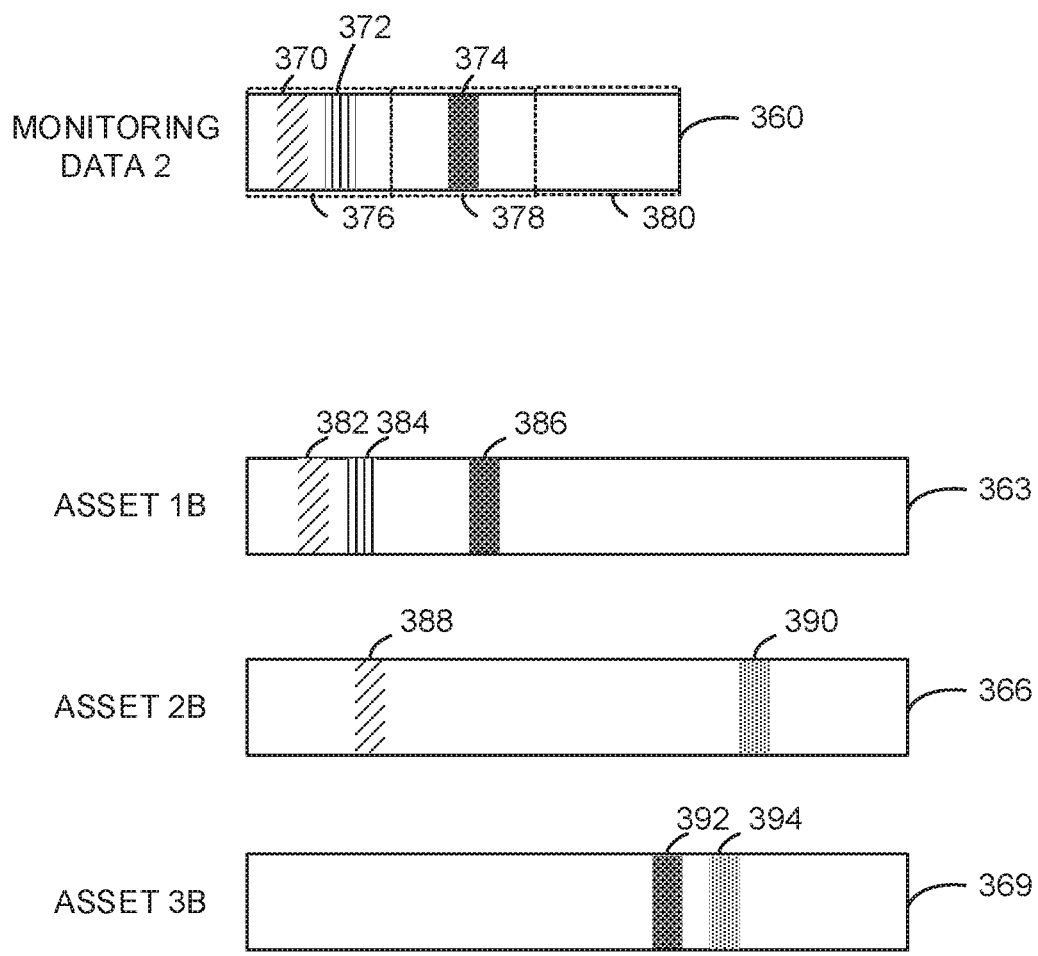

FIG. 3B is an example diagram representative of example reference media assets and example monitoring data that are processed by the example meter data analyzer 110 of FIG. 2 to determine signature matches for the purpose of crediting media exposure to the reference media assets. The example diagram of FIG. 3B includes example monitoring data 360, an example reference media asset 363, an example reference media asset 366, and an example reference media asset 369. The example media assets 363, 366, 369 are representative of example media assets stored in the example reference database 206. The example monitoring data 360 is representative of example monitoring data 104A, 104B, 104C collected by one of the example media meters 102A, 102B, 102C, which is assumed for the sake of convenience to be the example monitoring data 104A collected by the example media meter 102A in the illustrated example.

The example monitoring data 360 of the illustrated example of FIG. 3B includes example monitored media signatures 370, 372, 374 generated by the example media meter 102A. The example reference media asset 363 is associated with example reference signatures 382, 384, 386 generated to be representative of the reference media asset 363. The example reference media asset 366 is associated with example reference signatures 388, 390 generated to be representative of the reference media asset 366. The example reference media asset 369 is associated with example reference signatures 392, 394 generated to be representative of the reference media asset 369.

In the illustrated example, the example monitored media signatures 370, 372, 374 that are associated with the example monitoring data 360 are representative of the monitored media signatures included in the example monitoring data 104A. In the illustrated example, the reference signatures 382, 384, 386, 388, 390, 392, 394 associated with the example media assets 363, 366, 369 correspond to example reference signatures determined and stored in the example reference database 206.

The illustrated example of FIG. 3B represents monitoring data that is credited to a reference media asset based on the signature matching performed by the example meter data analyzer 110 of FIG. 2. The example media meter 102A generates the example monitored media signatures 370, 372, 374 from the example monitoring data 360. The example network interface 202 obtains the sequence of monitored media signatures 370, 372, 374 from the example monitoring data 360.

In the illustrated example of FIG. 3B, the example data segmenter 204 segments the example monitoring data 360 into evaluation periods 376, 378, 380. In some examples, the data segmenter 204 identifies a time duration of the sequence of monitored media signatures 370, 372, 374. As described above, the evaluation periods are discrete periods of time (e.g., three minutes, five minutes, etc.). In this illustrated example, the data segmenter 204 divides the monitoring data 360 associated with the sequence of monitored media signatures 370, 372, 374 into temporally adjacent evaluation periods 376, 378, 380.

In the illustrated example of FIG. 3B, the example signature matcher 208 obtains the monitored media signatures from the example monitoring data 360 for each evaluation period. For example, the example signature matcher 208 obtains the monitored media signatures 370, 372 for evaluation period 376 and the monitored media signature 374 for evaluation period 378. The example signature matcher 208 determines if the example monitored media signatures 370, 372, 374 from the example monitoring data 360 for each evaluation period 376, 378, 380 match the references signatures 382, 384, 386, 388, 390, 392, 394 from the example reference database 206. In some examples, the signature matcher 208 may perform matching using any suitable means (e.g., linear matching, hashed matching, etc.). In the illustrated example, the signature matcher 208 determines that the monitored media signature 370 matches the reference signatures 382, 388 during the evaluation period 376. The example signature matcher 208 determines that the monitored media signature 372 matches the reference signatures 384 during the evaluation period 376. The example signature matcher 208 determines that the monitored media signature 374 matches the reference signatures 386, 392 during the evaluation period 378.

In the illustrated example of FIG. 3B, the example signature matcher 208 then determines strong matches between the monitored media signatures 370, 372, 374 of the example monitoring data 360 and the reference signatures 382, 384, 386, 388, 390, 392, 394 of the media assets 363, 366, 369. The example signature matcher 208 determines the strength of the signature matching throughout the monitoring data 104A in each evaluation period 376, 378, 380. As described above, a "strong match" and a "weak match" are based on the number of signature matches that occur within the evaluation period. For example, a strong match can correspond to relatively high number of signature matches in a period of time (e.g., one signature match per second, five signature matches per second, etc.) and a weak match can correspond to relatively low number of signature matches in a period of time (e.g., one signature match per five seconds, etc.).

The example signature matcher 208 determines strong matches using a strong match threshold. In some examples, the strong match threshold can be three signature matches per second, etc. The example signature matcher 208 determines strong matches when the number of signature matches between the sequence of monitored media signatures and the reference signatures meets or exceeds the strong match threshold. In the illustrated example, the strong match threshold is assumed for the sake of convenience to be one signature match per minute. In the illustrated example, the signature matcher 208 determines that the example monitoring data 360 has strong matches between the example monitored media signatures 370, 372 and the example reference signatures 382, 384 associated with media asset 363 during the evaluation period 376. In the illustrated example, the signature matcher 208 determines that the example monitoring data 360 has strong matches between the example monitored media signature 374 and the example reference signatures 386, 392 associated with media assets 363, 369 respectively during the evaluation period 378.

In the illustrated example of FIG. 3B, the matched assets counter 210 then determines the number of unique media assets associated with the reference signatures from the reference database 206 identified by the strong matches for each evaluation period 376, 378, 380. The example matched assets counter 210 identifies all of the strong matches between the sequence of monitored media signatures from the monitoring data 104A during each evaluation period 376, 378, 380 and the sequences of reference signatures from the example reference database 206. The example matched assets counter 210 identifies the unique media assets that are associated with the reference signatures identified by the strong matches for each evaluation period 376, 378, 380. The example matched assets counter 210 determines the total number of unique media assets that are identified by the strong matches for each evaluation period 376, 378, 380. In the illustrated example, the matched assets counter 210 determines that the strong matches identify the unique media asset 363 associated with the matched reference signatures 382, 384 for the evaluation period 376. In the illustrated example, the matched assets counter 210 determines the monitoring data 360 has a total of one unique media asset associated with the strong matches for the evaluation period 376. In the illustrated example, the matched assets counter 210 determines that the strong matches identify the unique media assets 363, 369 associated with the matched reference signatures 386, 392 for the evaluation period 378. In the illustrated example, the matched assets counter 210 determines the monitoring data 360 has a total of two unique media assets associated with the strong matches for the evaluation period 378.

The example threshold determiner 212 determines if the total number of media assets associated with the strong matches for the example monitoring data 360 satisfies the example media asset threshold. In the illustrated example, the media asset threshold value may be two unique media assets found by the example matched assets counter 210. However, other media asset thresholds may additionally and/or alternatively be used such as, for example, five unique media assets, ten unique media assets, etc. In the illustrated example, the threshold determiner 212 determines the example monitoring data 360 for the evaluation period 376 does not satisfy the example media asset threshold since the monitoring data 360 for the evaluation period 376 has one unique media asset associated with the strong matches. In the illustrated example, the threshold determiner 212 determines the example monitoring data 360 for the evaluation period 378 does satisfy the example media asset threshold since the monitoring data 360 for the evaluation period 378 has two unique media asset associated with the strong matches.

The example credit determiner 214 then determines if an example media asset 363, 366, 369 should be credited for the media exposure of the example monitoring data 360 for each of the evaluation periods 376, 378, 380. The example credit determiner 214 uses the output from the example matched assets counter 210 and the example threshold determiner 212. In the illustrated example, the credit determiner 214 determines that the monitoring data 360 for the evaluation period 376 will be credited to the media asset 363 since the monitoring data 360 for the evaluation period 376 does not satisfy the media asset threshold. In the illustrated example, the credit determiner 214 outputs the crediting information of the media asset 363 to the creditor interface 216. In some examples, the creditor interface 216 provides the crediting information of the media asset 363 to the media exposure creditor 114 of the example of FIG. 1. In some examples, the credit determiner 214 determines that the monitoring data 360 for evaluation period 378 will not be credited to any of the media assets 363, 366, 369 since the monitoring data 360 for the evaluation period 378 satisfies the media asset threshold. In some examples, the credit determiner 214 does not output crediting information to the creditor interface 216 for the monitoring data 360 for evaluation period 378.

While an example manner of implementing the meter data analyzer 110 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example data segmenter 204, the example reference database 206, the example signature matcher 208, the example matched assets counter 210, the example threshold determiner 212, the example credit determiner 214, the example creditor interface 216 may be implemented by hardware, software, firmware and/or any combination of hardware, software and/or firmware. Thus, for example, any of the example network interface 202, the example data segmenter 204, the example reference database 206, the example signature matcher 208, the example matched assets counter 210, the example threshold determiner 212, the example credit determiner 214, the example creditor interface 216 and/or, more generally, the example meter data analyzer 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example data segmenter 204, the example reference database 206, the example signature matcher 208, the example matched assets counter 210, the example threshold determiner 212, the example credit determiner 214, and/or the example creditor interface 216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter data analyzer 110 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
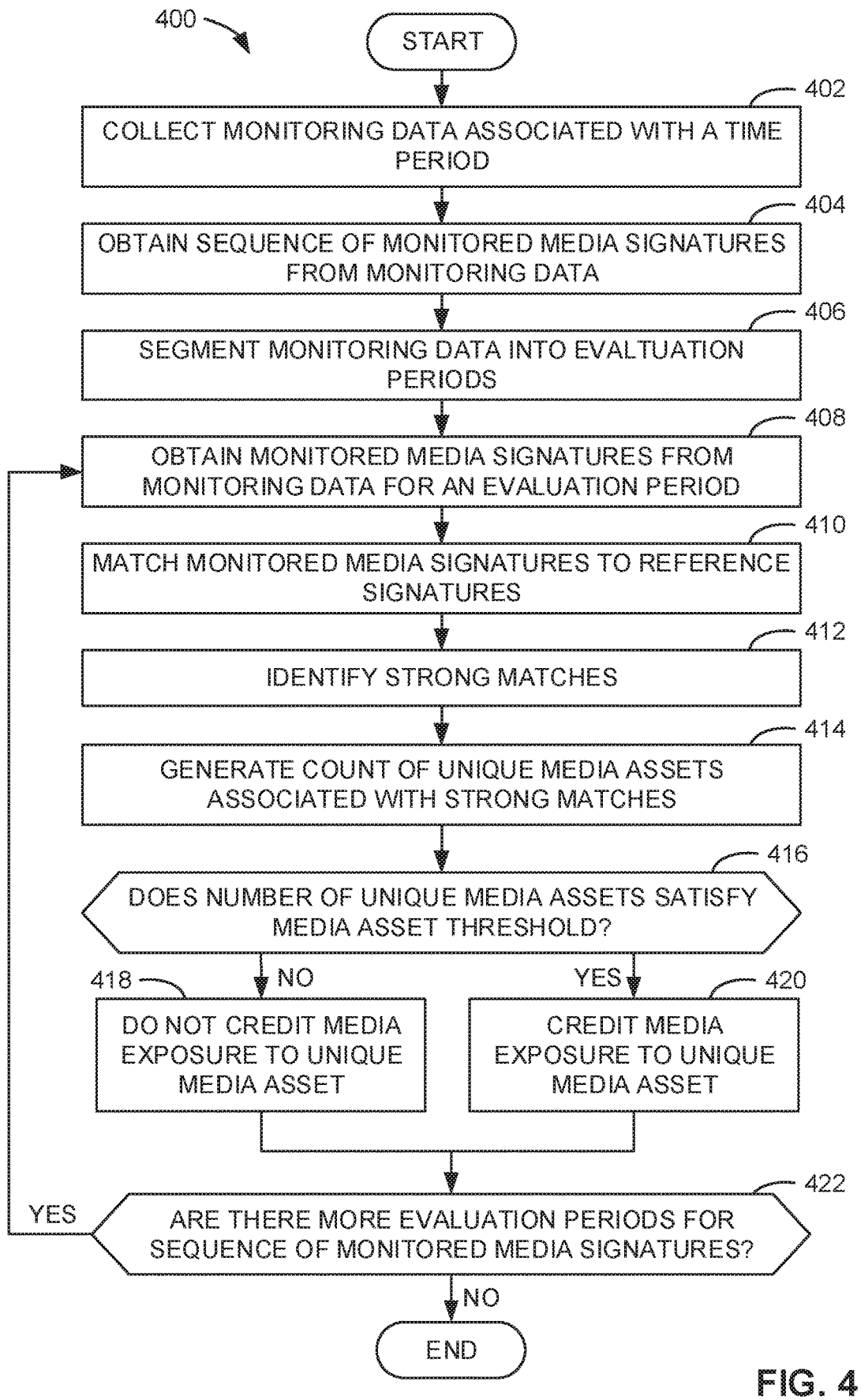
FIG. 4 is a flowchart representative of example machine readable instructions which may be executed to implement the meter data analyzer of FIG. 2.

A flowchart representative of example hardware logic, machine readable instructions, hardware implemented state machines, and/or any combination thereof for implementing the meter data analyzer 110 of FIG. 2 is shown in FIG. 4. The machine readable instructions may be one or more executable programs or portion(s) of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example meter data analyzer 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine readable instructions which may be executed to implement the example meter data analyzer 110 of FIG. 2. The program 400 of FIG. 4 begins execution at block 402 at which the example network interface 202 collects media meter data associated with a time period. For example, the network interface 202 allows the meter data analyzer 110 to receive monitoring data 104A, 104B, 104C from the example network 106. In some examples, the network interface can convert the received monitoring data 104A, 104B, 104C into a format readable by the meter data analyzer 110. The remainder of the process 400 of FIG. 4 is described with reference to the monitoring data 104A. However, the process 400 is also applicable to any other monitoring data described in this disclosure (e.g., the monitoring data 104B, 104C, 310, 360, etc.). In some examples, the network interface 202 can analyze the metadata (e.g., timestamps, etc.) associated with the monitoring data 104A to determine one or more time periods associated with the monitoring data 104A. At block 404, the example network interface 202 obtains the sequence of monitored media signatures from the example monitoring data 104A.

At block 406, the example data segmenter 204 segments the example monitoring data 104A into evaluation periods. The example data segmenter 204 identifies the sequence of monitored media signatures associated with the monitoring data 104A. In some examples, the data segmenter 204 identifies a time duration of the sequence of monitored media signatures based on the amount of time between the first monitored media signature in the sequence and the last monitored media signature in the sequence. The example data segmenter 204 segments the received example monitoring data 104A associated with the sequence of monitored media signatures into evaluation periods. As used herein, the evaluation periods are discrete periods of time (e.g., three minutes, five minutes, etc.). For example, the data segmenter 204 can divide the monitoring data 104A associated with the sequence of monitored media signatures into temporally adjacent evaluation periods.

At block 408, the example signature matcher 208 obtains the monitored media signatures from the example monitoring data 104A for an evaluation period. The example signature matcher 208 obtains the monitored media signatures that occur within an evaluation period of the sequence of monitored media signatures associated with the monitoring data 104A.

At block 410, the example signature matcher 208 matches the monitored media signatures to the reference signatures. In some examples, the signature matcher 208 matches the monitored media signatures that occur within the evaluation period to the sequences of reference signatures from the reference database 206 to identify media assets associated with monitoring data 104A. In some examples, some or all of the monitored media signatures of the monitoring data 104A in the evaluation period can match with corresponding reference signatures in the reference database 206 that represent a piece of reference media (e.g., reference signatures associated with a television episode, etc.). In some examples, the signature matcher 208 may perform matching using any suitable means (e.g., linear matching, hashed matching, etc.).

At block 412, the example signature matcher 208 identifies the strong signature matches. The example signature matcher 208 determines the strength of the signature matching throughout the monitoring data 104A in the evaluation period. As used herein, a "strong match" and a "weak match" are based on the number of signature matches that occur within the evaluation period. For example, a strong match can correspond to relatively high number of signature matches in a period of time (e.g., one signature match per second, five signature matches per second, etc.) and a weak match can correspond to relatively low number of signature matches in a period of time (e.g., one signature match per five seconds, etc.). However, any other suitable number of signature matches in the evaluation period can correspond to strong matching. The example signature matcher 208 determines strong matches using a strong match threshold. In some examples, the strong match threshold can be three signature matches per second, etc. The example signature matcher 208 determines strong matches when the number of signature matches between the sequence of monitored media signatures and the reference signatures meets or exceeds the strong match threshold. The example signature matcher 208 identifies the strong matches between the monitored media signatures and the reference signatures for the evaluation period.

At block 414, the example matched assets counter 210 generates the count of unique media assets associated with the strong matches. The example matched assets counter 210 identifies all of the strong matches between the sequence of monitored media signatures from the monitoring data 104A and the sequences of reference signatures from the example reference database 206 for the evaluation period. The example matched assets counter 210 identifies the unique media assets that are associated with the reference signatures identified by the strong matches. The example matched assets counter 210 determines the total number of unique media assets that are identified by the strong matches.

At block 416, the example threshold determiner 212 determines if the number of unique media assets satisfies (e.g., is less than) the media asset threshold. For example, the media asset threshold value may be two unique media assets found by the example matched assets counter 210. However, other media asset thresholds may additionally and/or alternatively be used such as, for example, five unique media assets, ten unique media assets, etc. If the example threshold determiner 212 determines that the number of unique media assets does not satisfy the media asset threshold, the example program 400 continues to block 418 where the example credit determiner 214 does not credit the media exposure to a unique media asset. If the example threshold determiner 212 determines that the number of unique media assets satisfies (e.g., is equal to or greater than) the media asset threshold, the example program 400 continues to block 420 where the example credit determiner 214 credits the media exposure to the unique media asset associated with the reference signatures of the strong matches.

At block 418, the example credit determiner 214 does not credit the media exposure to a unique media asset associated with the reference signatures of the strong matches. At block 420, the example credit determiner 214 credits the media exposure to the unique media asset associated with the reference signatures of the strong matches. In some examples, the credit determiner 214 outputs the media asset identified by the matched assets counter 210 to the creditor interface 216. In some examples, the creditor interface 216 provides the output of the media asset information from the credit determiner 214 to the media exposure creditor 114.

At block 422, the example signature matcher 208 determines if there are more evaluation periods for the sequence of monitored media signatures. If the example signature matcher 208 determines that there are more evaluation periods for the sequence of monitored media signatures, then process 400 return to block 408 at which the example signature matcher 208 obtains the monitored media signatures from the example monitoring data 104A for the next evaluation period. If the example signature matcher 208 determines that there are not anymore evaluation periods for the sequence of monitored media signatures, then program 400 end.

Figure 5:
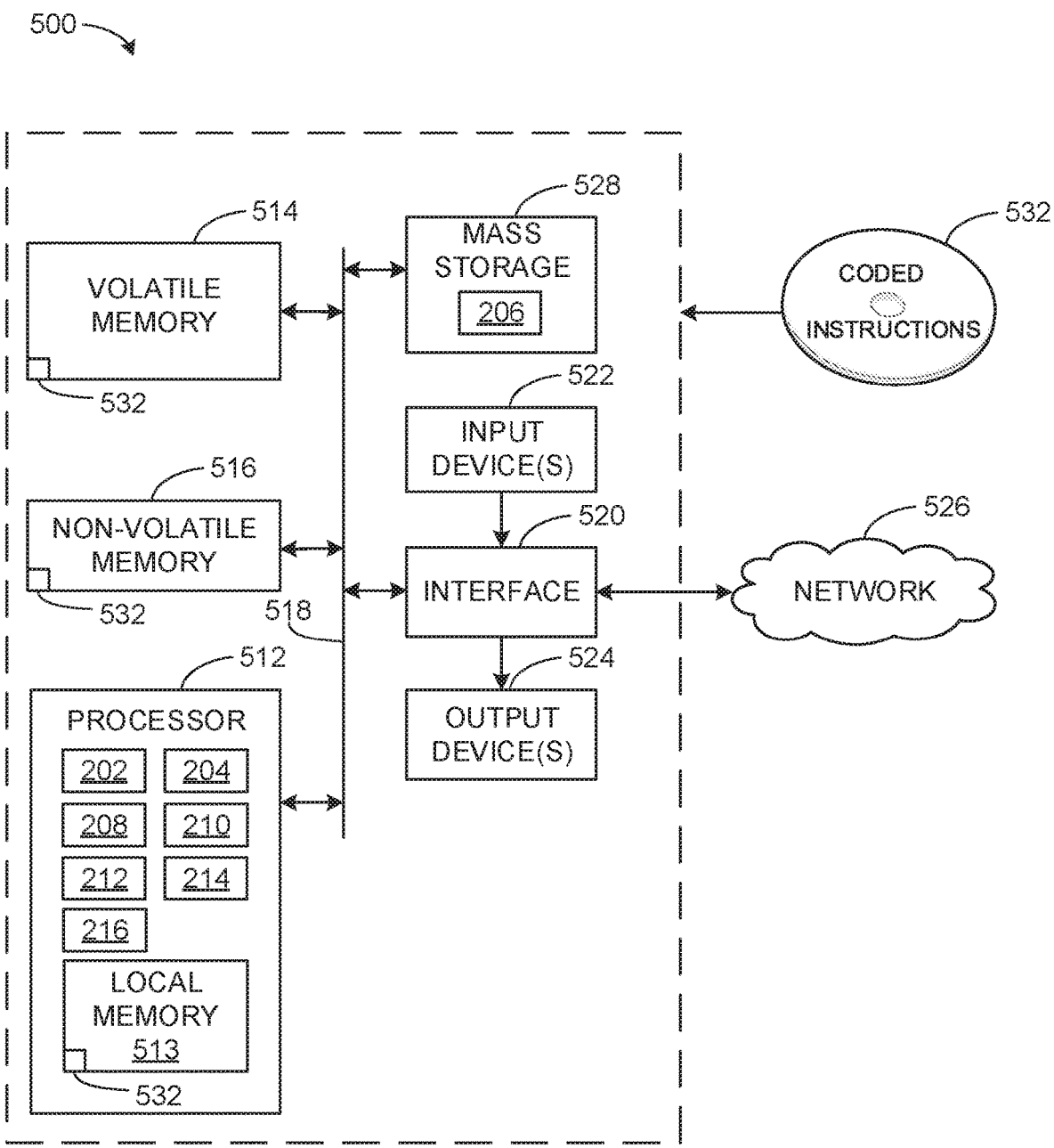
FIG. 5 is a block diagram of an example processing platform structured to execute the instructions of FIG. 4 to implement the meter data analyzer of FIGS. 1 and 2.

FIG. 5 is a block diagram of an example processor platform 500 structured to execute the instructions of FIG. 4 to implement the meter data analyzer 110 of FIG. 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 202, the example data segmenter 204, the example reference database 206, the example signature matcher 208, the example matched assets counter 210, the example threshold determiner 212, the example credit determiner 214, and the example creditor interface 216.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives. The example reference database 206 may be implemented by one or more mass storage devices 528.

The machine executable instructions 532 of FIG. 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that allow for optimization of reference signature matching. The disclosed methods, apparatus and articles of manufacture improve the efficiency of using a computing device by reducing computational and storage requirements of systems that identify media using signatures. The disclosed examples prevent incorrect crediting by determining strong matches between monitored media signatures and reference signatures. The disclosed example allow for more accurate crediting of media through signature matching. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to reduce false crediting of exposure to video-on-demand media assets are disclosed herein. Further examples and combinations thereof include the following:

Example 1 includes an apparatus comprising a signature matcher to compare a sequence of monitored media signatures to sequences of reference signatures representative of corresponding reference media assets, the sequence of monitored media signatures included in monitoring data reported by a media device meter, the sequences of reference signature stored in a library of reference signatures, a matched assets counter to determine a count of ones of the reference media assets represented by corresponding ones of the sequences of reference signatures determined to match the sequence of monitored media signatures, and a credit determiner to determine whether to credit media exposure to a first one of the reference media assets based on the count.

Example 2 includes the apparatus of example 1, wherein the apparatus includes a data segmenter to segment the sequence of monitored media signatures into temporally adjacent evaluation periods, the evaluation periods corresponding to discrete periods of time.

Example 3 includes the apparatus of example 2, wherein the signature matcher is to compare the sequence of monitored media signatures in each evaluation period to the sequences of reference signature.

Example 4 includes the apparatus of example 1, wherein the media device meter is to monitor media presented by a media device.

Example 5 includes the apparatus of example 1, wherein the matched assets counter is to identify strong matches between the sequence of monitored media signatures and the sequences of reference signatures, and generate the count based on a number of unique reference media assets represented by the strong matches.

Example 6 includes the apparatus of example 5, wherein the matched assets counter is to identify a strong match based on whether a number of signature matches within a period of time satisfies a strong match threshold.

Example 7 includes the apparatus of example 1, further including a threshold determiner to determine if the count of ones of the reference media assets satisfies a media asset threshold.

Example 8 includes the apparatus of example 7, wherein the credit determiner is to determine whether to credit media exposure to a first one of the reference media assets based on whether the count of ones of the reference media assets satisfies the media asset threshold.

Example 9 includes a method comprising comparing, by executing an instruction with a processor, a sequence of monitored media signatures to sequences of reference signatures representative of corresponding reference media assets, the sequence of monitored media signatures included in monitoring data reported by a media device meter, the sequences of reference signature stored in a library of reference signatures, determining, by executing an instruction with the processor, a count of ones of the reference media assets represented by corresponding ones of the sequences of reference signatures determined to match the sequence of monitored media signatures, and determining, by executing an instruction with the processor, whether to credit media exposure to a first one of the reference media assets based on the count.

Example 10 includes the method of example 9, further including segmenting the sequence of monitored media signatures into temporally adjacent evaluation periods, the evaluation periods corresponding to discrete periods of time.

Example 11 includes the method of example 10, wherein the sequence of monitored media signatures are compared to the sequence of reference signature for each evaluation period.

Example 12 includes the method of example 9, wherein the monitoring data is obtained from monitoring media presented by a media device.

Example 13 includes the method of example 9, further including identifying strong matches between the sequence of monitored media signatures and the sequences of reference signatures, and generating the count based on a number of unique reference media assets represented by the strong matches.

Example 14 includes the method of example 13, wherein a strong match is identified based on whether a number of signature matches within a period of time satisfies a strong match threshold.

Example 15 includes the method of example 9, further including determining if the count of ones of the reference media assets satisfies a media asset threshold example 16 includes the method of example 15, wherein the determining of whether to credit media exposure to a first one of the reference media assets is based on whether the count of ones of the reference media assets satisfies the media asset threshold.

Example 17 includes a non-transitory computer readable medium comprising instructions which, when executed, cause a machine to at least compare a sequence of monitored media signatures to sequences of reference signatures representative of corresponding reference media assets, the sequence of monitored media signatures included in monitoring data reported by a media device meter, the sequences of reference signature stored in a library of reference signatures, determine a count of ones of the reference media assets represented by corresponding ones of the sequences of reference signatures determined to match the sequence of monitored media signatures, and determine whether to credit media exposure to a first one of the reference media assets based on the count.

Example 18 includes the non-transitory computer readable medium of example 17, wherein the instructions cause the machine to segment the sequence of monitored media signatures into temporally adjacent evaluation periods, the evaluation periods corresponding to discrete periods of time.

Example 19 includes the non-transitory computer readable medium of example 18, wherein the instructions cause the machine to compare the sequence of monitored media signatures in each evaluation period to the sequence of reference signature example 20 includes the non-transitory computer readable medium of example 17, wherein the monitoring data is obtained from monitoring media presented by a media device.

Example 21 includes the non-transitory computer readable medium of example 17, wherein the instructions, when executed, cause the machine to identify strong matches between the sequence of monitored media signatures and the sequences of reference signatures, and generate the count based on a number of unique reference media assets represented by the strong matches.

Example 22 includes the non-transitory computer readable medium of example 21, wherein a strong match is based on whether a number of signature matches within a period of time satisfies a strong match threshold.

Example 23 includes the non-transitory computer readable medium of example 17, wherein the instructions cause the machine to determine if the count of ones of the reference media assets satisfies a media asset threshold.

Example 24 includes the non-transitory computer readable medium of example 23, wherein the instructions cause the machine to determine whether to credit media exposure to a first one of the reference media assets based on whether the count of ones of the reference media assets satisfies the media asset threshold.

The following claims are hereby incorporated into this Detailed Description by this reference, with each claim standing on its own as a separate embodiment of the present disclosure.

What is claimed is:

1. An apparatus comprising:
    a signature matcher to compare a sequence of monitored media signatures to respective different sequences of reference signatures representative of corresponding different reference media assets, the sequence of monitored media signatures included in monitoring data reported by a media device meter, the different sequences of reference signature stored in a library of reference signatures;
    a matched assets counter to:
        identify which ones of the different sequences of reference signatures have been determined to match the sequence of monitored media signatures;
        identify corresponding ones of the different reference media assets represented by the identified ones of the different sequences of reference signatures determined to have a strong match with the sequence of monitored media signatures, wherein the strong match is based on whether a number of signature matches within a period of time satisfies a strong match threshold; and
        determine a count of the identified strong matched ones of the different reference media assets; and
    a credit determiner to credit media exposure to a first one of the reference media assets when the count of the identified ones of the different reference media assets is less than a media asset threshold.

2. The apparatus of claim 1, wherein the apparatus includes a data segmenter to segment the sequence of monitored media signatures into temporally adjacent evaluation periods, the evaluation periods corresponding to discrete periods of time.

3. The apparatus of claim 2, wherein the signature matcher is to compare the sequence of monitored media signatures in each evaluation period to the respective sequences of reference signature.

4. The apparatus of claim 1, wherein the media device meter is to monitor media presented by a media device.

5. The apparatus of claim 1, further including a threshold determiner to determine if the count of the ones of the different reference media assets satisfies the media asset threshold.

6. A method comprising:
    comparing, by executing an instruction with a processor, a sequence of monitored media signatures to respective different sequences of reference signatures representative of corresponding different reference media assets, the sequence of monitored media signatures included in monitoring data reported by a media device meter, the different sequences of reference signature stored in a library of reference signatures;

identifying, by executing an instruction with the processor, which ones of the different sequences of reference signatures have been determined to match the sequence of monitored media signatures;

identifying, by executing an instruction with the processor, corresponding ones of the different reference media assets represented by the identified ones of the different sequences of reference signatures determined to have a strong match with the sequence of monitored media signatures, wherein the strong match is based on whether a number of signature matches within a period of time satisfies a strong match threshold;

determining, by executing an instruction with the processor, a count of the ones of the identified strong matched different reference media assets; and crediting, by executing an instruction with the processor, media exposure to a first one of the reference media assets when the count of the ones of the different reference media assets is less than a media asset threshold.

7. The method of claim 6, further including segmenting the sequence of monitored media signatures into temporally adjacent evaluation periods, the evaluation periods corresponding to discrete periods of time.

8. The method of claim 6, further including:
identifying strong matches between the sequence of monitored media signatures and the respective sequences of reference signatures; and
generating the count based on a number of unique reference media assets represented by the strong matches.

9. The method of claim 6, further including determining if the count of the ones of the different reference media assets satisfies the media asset threshold.

10. A non-transitory computer readable medium comprising instructions which, when executed, cause a machine to at least:

compare a sequence of monitored media signatures to respective different sequences of reference signatures representative of corresponding different reference media assets, the sequence of monitored media signatures included in monitoring data reported by a media device meter, the different sequences of reference signature stored in a library of reference signatures;

identify which ones of the different sequences of reference signatures have been determined to match the sequence of monitored media signatures;

identify corresponding ones of the different reference media assets represented by the identified ones of the different sequences of reference signatures determined to have a strong match with the sequence of monitored media signatures, wherein the strong match is based on whether a number of signature matches within a period of time satisfies a strong match threshold;

determine a count of the identified strong matched ones of the different reference media assets; and credit media exposure to a first one of the reference media assets when the count of the identified ones of the different reference media assets is less than a media asset threshold.

11. The non-transitory computer readable medium of claim 10, wherein the instructions cause the machine to segment the sequence of monitored media signatures into temporally adjacent evaluation periods, the evaluation periods corresponding to discrete periods of time.

12. The non-transitory computer readable medium of claim 11, wherein the instructions cause the machine to compare the sequence of monitored media signatures in each evaluation period to the respective sequences of reference signature.

13. The non-transitory computer readable medium of claim 10, wherein the instructions cause the machine to determine if the count of the ones of the different reference media assets satisfies the media asset threshold.

* * * * *